(12) United States Patent
Morishita

(10) Patent No.: US 8,433,884 B2
(45) Date of Patent: Apr. 30, 2013

(54) MULTIPROCESSOR

(75) Inventor: Hiroyuki Morishita, Osaka (JP)

(73) Assignee: Panasonic Corporation, Osaka (JP)

( * ) Notice: Subject to any disclaimer, the term of this patent is extended or adjusted under 35 U.S.C. 154(b) by 641 days.

(21) Appl. No.: 12/674,052

(22) PCT Filed: Jun. 16, 2009

(86) PCT No.: PCT/JP2009/002735
§ 371 (c)(1),
(2), (4) Date: Feb. 18, 2010

(87) PCT Pub. No.: WO2009/153977
PCT Pub. Date: Dec. 23, 2009

(65) Prior Publication Data
US 2011/0113220 A1     May 12, 2011

(30) Foreign Application Priority Data
Jun. 19, 2008   (JP) .................................. 2008-159964

(51) Int. Cl.
*G06F 9/312*   (2006.01)

(52) U.S. Cl.
USPC ........................... 712/225; 712/218; 712/220

(58) Field of Classification Search .................. 712/218, 712/220, 225
See application file for complete search history.

(56) References Cited

U.S. PATENT DOCUMENTS

| | | | |
|---|---|---|---|
| 6,223,208 B1 * | 4/2001 | Kiefer et al. | 718/108 |
| 7,281,118 B2 * | 10/2007 | Bridges et al. | 712/30 |
| 7,321,965 B2 | 1/2008 | Kissell | |
| 7,376,954 B2 | 5/2008 | Kissell | |
| 7,418,585 B2 | 8/2008 | Kissell | |
| 7,424,599 B2 | 9/2008 | Kissell et al. | |

(Continued)

FOREIGN PATENT DOCUMENTS

| | | |
|---|---|---|
| JP | 4-195664 | 7/1992 |
| JP | 2006-99332 | 4/2006 |

(Continued)

OTHER PUBLICATIONS

Hiroaki Hirata et al., "A Multithreaded Processer Architecture with Simultaneous Instruction Issuing", In Proc. of ISS'37: International Symposium on Supercomputing, Fukuoka, Japan, 99.87-96, Nov. 1991.

(Continued)

*Primary Examiner* — Aimee Li
(74) *Attorney, Agent, or Firm* — Wenderoth, Lind & Ponack, L.L.P.

(57) ABSTRACT

A multiprocessor executes a plurality of threads without decreasing execution efficiency. The multiprocessor includes a first processor allocating a different register file to each of a predetermined number of threads to be executed from among plural threads, and executing the predetermined number of threads in parallel; and a second processor performing processing according to a processing request made by the first processor. The first processor has areas allocated to the plurality of threads in one-to-one correspondence, makes the processing request to the second processor according to an instruction included in one of the predetermined number of threads, upon receiving a request for writing a value resulting from the processing from the second processor, judges whether the one thread is being executed, and when judging negatively, performs control such that the obtained value is written into one of the areas allocated to the one thread.

9 Claims, 10 Drawing Sheets

U.S. PATENT DOCUMENTS

| | | | |
|---|---|---|---|
| 7,555,593 B1 * | 6/2009 | Rosman | 711/108 |
| 7,594,089 B2 | 9/2009 | Vishin et al. | |
| 7,610,473 B2 | 10/2009 | Kissell | |
| 7,647,475 B2 * | 1/2010 | Svendsen et al. | 712/34 |
| 8,032,734 B2 * | 10/2011 | Svendsen et al. | 712/34 |
| 2003/0225816 A1 * | 12/2003 | Morrow et al. | 709/107 |
| 2005/0050305 A1 | 3/2005 | Kissell | |
| 2005/0050395 A1 | 3/2005 | Kissell | |
| 2005/0120194 A1 | 6/2005 | Kissell | |
| 2005/0125629 A1 | 6/2005 | Kissell | |
| 2005/0125795 A1 | 6/2005 | Kissell | |
| 2005/0240936 A1 | 10/2005 | Jones et al. | |
| 2005/0251613 A1 | 11/2005 | Kissell | |
| 2005/0251639 A1 | 11/2005 | Vishin et al. | |
| 2006/0161421 A1 | 7/2006 | Kissell | |
| 2006/0161921 A1 | 7/2006 | Kissell | |
| 2006/0190945 A1 | 8/2006 | Kissell | |
| 2006/0190946 A1 | 8/2006 | Kissell | |
| 2006/0195683 A1 | 8/2006 | Kissell | |
| 2006/0282624 A1 | 12/2006 | Yokota | |
| 2007/0043935 A2 | 2/2007 | Kissell | |
| 2007/0044106 A2 | 2/2007 | Kissell | |
| 2007/0106887 A1 | 5/2007 | Kissell | |
| 2007/0106988 A1 | 5/2007 | Kissell | |
| 2007/0106989 A1 | 5/2007 | Kissell | |
| 2007/0106990 A1 | 5/2007 | Kissell | |
| 2007/0186028 A2 | 8/2007 | Kissell | |
| 2008/0109809 A1 | 5/2008 | Morishita et al. | |
| 2008/0140998 A1 | 6/2008 | Kissell | |
| 2008/0209168 A1 | 8/2008 | Yokota | |
| 2009/0037916 A1 | 2/2009 | Morishita et al. | |
| 2009/0063881 A1 * | 3/2009 | Stephens | 713/320 |

FOREIGN PATENT DOCUMENTS

| | | |
|---|---|---|
| JP | 2006-350531 | 12/2006 |
| JP | 2007-504535 | 3/2007 |
| JP | 2008-52750 | 3/2008 |
| JP | 2008-123045 | 5/2008 |

OTHER PUBLICATIONS

International Search Report issued Jul. 28, 2009 in International (PCT) Application No. PCT/JP2009/002735.

Popov, K. *A Parallel Abstract Machine for the Thread-Based Concurrent Language Oz, PS Lab*, University of Saarland (Sep. 22, 1997), pp. 1-19.

Tsai, J. et al. *The Superthreaded Architecture: Thread Pipelining with Run-time Data Dependence Checking and Control Speculation*, Center for Supercomputing R & D, pp. 1-12.

Morishita, H. et al., *Stream parsing unit of media processor for HDTV application (MCP2), IPSJ SIG Notes*, vol. 2001, No. 22 (Mar. 8, 2001), pp. 31-36.

* cited by examiner

T100

Thread information table

| Thread ID | Valid flag | Logical processor ID | Thread state flag | Base address |
|---|---|---|---|---|
| 00001 | 1 | 00 | 01 | 0x2000000 |
| 00010 | 1 | 10 | 01 | 0x3000000 |
| 00011 | 1 | 01 | 00 | 0x4000000 |
| 00100 | 0 | 00 | 01 | 0x2000000 |
|  | 0 |  |  |  |
|  | 0 |  |  |  |
|  | 0 |  |  |  |
|  | 0 |  |  |  |

201 202 203 204 205
206
208

T110

301 Operation code | 302 Rs(SRC) | 303 Rd(DST)

MULTIPROCESSOR

TECHNICAL FIELD

The present invention relates to a technique for efficiently transferring data between processors. One of the processors is capable of simultaneously executing a plurality of threads, and the other processor performs processing according to a processing request made by the one processor.

BACKGROUND ART

In order to perform media processing such as compression and expansion of digitized video data or audio data, dedicated hardware and a high-performance DSP (Digital Signal Processor) are used.

In recent years, the media processing has been more complicated, and an image size and the number of audio channels, for example, have been increasing. Accordingly, an operation amount required for the media processing has been increasing steadily. Therefore, a processing efficiency needs to be enhanced.

A non-patent literature 1, for example, discloses a high-performance multithreaded processor in which the operation efficiency has been greatly enhanced by simultaneously executing a plurality of programs. The performance of the media processing can be enhanced by using the multithreaded processor.

CITATION LIST

Non-Patent Literature

[Non-Patent Literature 1]
"A Multithreaded Processor Architecture with Simultaneous Instruction Issuing", In Proc. of ISS'91: International Symposium on Supercomputing, Fukuoka, Japan, pp. 87-96, November 1991

SUMMARY OF INVENTION

However, a problem arises, when data transfer between processors is performed, in a method that realizes the media processing with use of the multithreaded processor disclosed in the non-patent literature 1.

Specifically, when the multithreaded processor executes a plurality of threads in order to realize some application, and another processor performs processing according to a processing request made by one of the threads being executed by the multithreaded processor, data needs to be transferred between these processors. In this transfer operation, when the thread at a data-receiving side (thread that has made the processing request) is inactive, it is necessary that another processor waits until the thread at the data-receiving side becomes active or that processing is performed that activates the thread at the data-receiving side. During the waiting or the processing, another processor (data transmitting processor) uses a resource. This decreases the operation efficiency of another processor.

FIG. 13 shows a specific example. Note that two logical processors execute different threads from one another. An extended operation processor performs processing according to a processing request made by a thread included in one of the logical processors, and returns a result obtained by the processing to the thread that has made the processing request.

In a time period t0, a thread 2 and a thread 1 are executed in a first logical processor and a second logical processor, respectively (Step S500 and Step S501).

In a time period t1, the thread 1 makes a processing request to the extended operation processor. Upon receiving the processing request, the extended operation processor performs the processing according to the request made by the thread 1 (Step S502).

In a time period t2, the thread 1 is inactive, and the second logical processor executes a thread 3 (Step S503). Then, the extended operation processor completes the processing in a time period t3 in which the thread 3 is executed. In this case, since the thread 3 is executed, the extended operation processor is unable to reflect a result obtained by the processing to the thread 1. Therefore, until an execution target in the second logical processor switches from the thread 3 to the thread 1, the extended operation processor is in an awaiting state. Therefore, even if a processing request made by the thread 2 is issued in a time period t4, the extended operation processor is unable to receive the processing request.

Subsequently, when the execution target in the second logical processor switches from the thread 3 to the thread 1 (time period t5), the extended operation processor writes the result obtained by the processing in Step S502 into the thread 1, and becomes freed from the processing requested by the thread 1 (time period t6).

In a time period t6 onwards, the second logical processor executes the thread 1 to which the result obtained by the processing is reflected (Step S504).

Then, receiving a processing request made by the thread 2 in a time period t7, the extended operation processor performs the processing according to the processing request made by the thread 2.

In such a way, although the processing relating to the thread 1 has ended, the thread 1 is not executed from the time periods t3 to t5 (i.e. the result obtained by the processing cannot be reflected to the thread 1). Therefore, since the extended operation processor remains occupied by the thread 1, the operation efficiency decreases.

In view of the above, the present invention has an objective to provide a multiprocessor and a processing method that are each capable of executing a plurality of threads without decreasing the processing efficiency.

In order to achieve the above-stated objective, the present invention is a multiprocessor that includes: a first processor that allocates a different register file to each of a predetermined number of threads to be executed from among a plurality of threads, and executes the predetermined number of threads in parallel; and a second processor that performs processing in accordance with a processing request made by the first processor, wherein upon receiving the processing request from the first processor, the second processor performs the processing, and makes a writing request to the first processor for writing a value obtained as a result of the processing, and the first processor includes: a storage unit that has areas allocated to the plurality of threads in one-to-one correspondence; a first control unit operable, when any of the predetermined number of threads falls in a non-execution state, to write a value into a corresponding one of the areas, the value being included in one of the register files allocated to the any thread; a second control unit operable to (i) make the processing request to the second processor according to an instruction included in one of the predetermined number of threads, (ii) upon receiving the writing request from the second processor, judge whether the one thread is being executed, and (iii) when judging negatively, perform control such that the obtained value is written into part of one of the areas allocated to the one thread; and a third control unit operable, when the any thread falls back in an execution state, to restore, in the one of the register files, the value written into the corresponding one of the areas.

According to this structure, upon receiving the writing request from the second processor, the first processor included in the multiprocessor writes the value obtained as a result of the processing into the storage unit when the thread that has made the processing request to the second processor is not being executed. Therefore, the second processor can complete the processing requested by the thread. Thus, since the first processor can make the next processing request to the second processor, the multiprocessor can execute the plurality of threads without decreasing the execution efficiency.

Here, when making the processing request to the second processor, the second control unit may output, to the second processor, a thread identifier that identifies the one thread, upon receiving the thread identifier from the first processor, the second processor stores therein the thread identifier, and upon receiving the writing request from the second processor, the second control unit may acquire the thread identifier stored in the second processor, and specifies the one thread based on the acquired thread identifier.

According to this structure, upon receiving the writing request, the first processor included in the multiprocessor acquires, from the second processor, the thread identifier that identifies the thread that has made the processing request. Therefore, the first processor can reliably specify the thread for the judgment.

Here, the second control unit may store therein a head address for each of the areas, the second processor may make the writing request to the first processor after executing an instruction including (i) an operation code instructing to transfer the obtained value, (ii) a first operand specifying a register storing therein the obtained value, the register being included in a register file included in the second processor and (iii) a second operand specifying a register to which the obtained value is to be transferred, the register being included in a corresponding one of the register files included in the first processor, when judging that the one thread is not being executed, the second control unit may specify, for the obtained value, a writing location in the storage unit with use of the head address for the one area allocated to the one thread and the register specified by the second operand included in the executed instruction, and performs control such that the obtained value is written into the specified writing location, and when judging that the one thread is being executed, the second processor may perform control such that the obtained value is written into the specified register included in the corresponding register file identified by a corresponding one of register identifiers.

According to this structure, since the second processor executes the instruction, a writing location included in the second processor for the obtained value and a location of the thread (that has made the processing request) into which the obtained value is to be written can be specified.

Here, the second control unit may store therein (i) each of the plurality of threads in correspondence with a flag showing whether or not each of the plurality of threads is being executed, and (ii) each of the predetermined number of threads in correspondence with one of the register identifiers, the register identifiers identifying the register files in one-to-one correspondence, and the second control unit may perform the judgment with use of the flag corresponding to the one thread.

According to this structure, the first processor can reliably judge whether or not the thread for the judgment is being executed with use of the flag.

Here, when making the processing request to the second processor, the second control unit may output, to the second processor, a thread identifier that identifies the one thread, upon receiving the thread identifier from the first processor, the second processor may store therein the thread identifier, and makes the writing request to the first processor, the writing request including the thread identifier, and upon receiving the writing request from the second processor, the second control unit may specify the one thread for the judgment based on the thread identifier included in the received writing request.

According to this structure, since the first processor included in the multiprocessor receives the writing request including the thread identifier that identifies the thread that has made the processing request, the first processor can reliably specify the thread for the judgment.

Here, the second control unit may store therein a head address for each of the areas, the second processor may make the writing request to the first processor after executing an instruction including (i) an operation code instructing to transfer the obtained value, (ii) a first operand specifying a register storing therein the obtained value, the register being included in a register file included in the second processor, (iii) a second operand specifying a register to which the obtained value is to be transferred, the register being included in a corresponding one of the register files included in the first processor, and (iv) the thread identifier that identifies the one thread, and when judging that the one thread is not being executed, the second control unit may specify, for the obtained value, a writing location in the storage unit with use of the head address for the one area allocated to the one thread and the register specified by the second operand included in the executed instruction, and performs control such that the obtained value is written into the specified writing location.

According to this structure, since the second processor executes the instruction, a writing location included in the second processor for the obtained value, a location of the thread (that has made the processing request) into which the obtained value is to be written and the thread that has made the processing request can be specified.

Here, the multiprocessor may be a processing system that performs decoding processing of video, wherein the execution of each of the predetermined number of threads by the first processor may be part of the decoding processing that decodes a variable-length coded signal, and the processing performed by the second processor may relate to parts of the decoding processing that are an inverse quantization, an inverse frequency transform, a motion compensation and an addition of image data.

According to this structure, the plurality of threads can be executed by the decoding processing performed by the multiprocessor without decreasing the execution efficiency.

Here, the multiprocessor may be a processing system that performs encoding processing of video, wherein the execution of each of the predetermined number of threads by the first processor may be part of the encoding processing that performs a variable-length coding on image data, and the processing performed by the second processor may relate to parts of the encoding processing that are an error prediction for the image data to be encoded, a quantization, a frequency transform, a motion compensation, a motion search, an inverse quantization, an inverse frequency transform and an addition of the image data.

According to this structure, the plurality of threads can be executed by the encoding processing performed by the multiprocessor without decreasing the execution efficiency.

DESCRIPTION OF INVENTION

1. First Embodiment

A first embodiment of the present invention is described below with reference to the drawings.

1. 1 Structure

Figure 1:
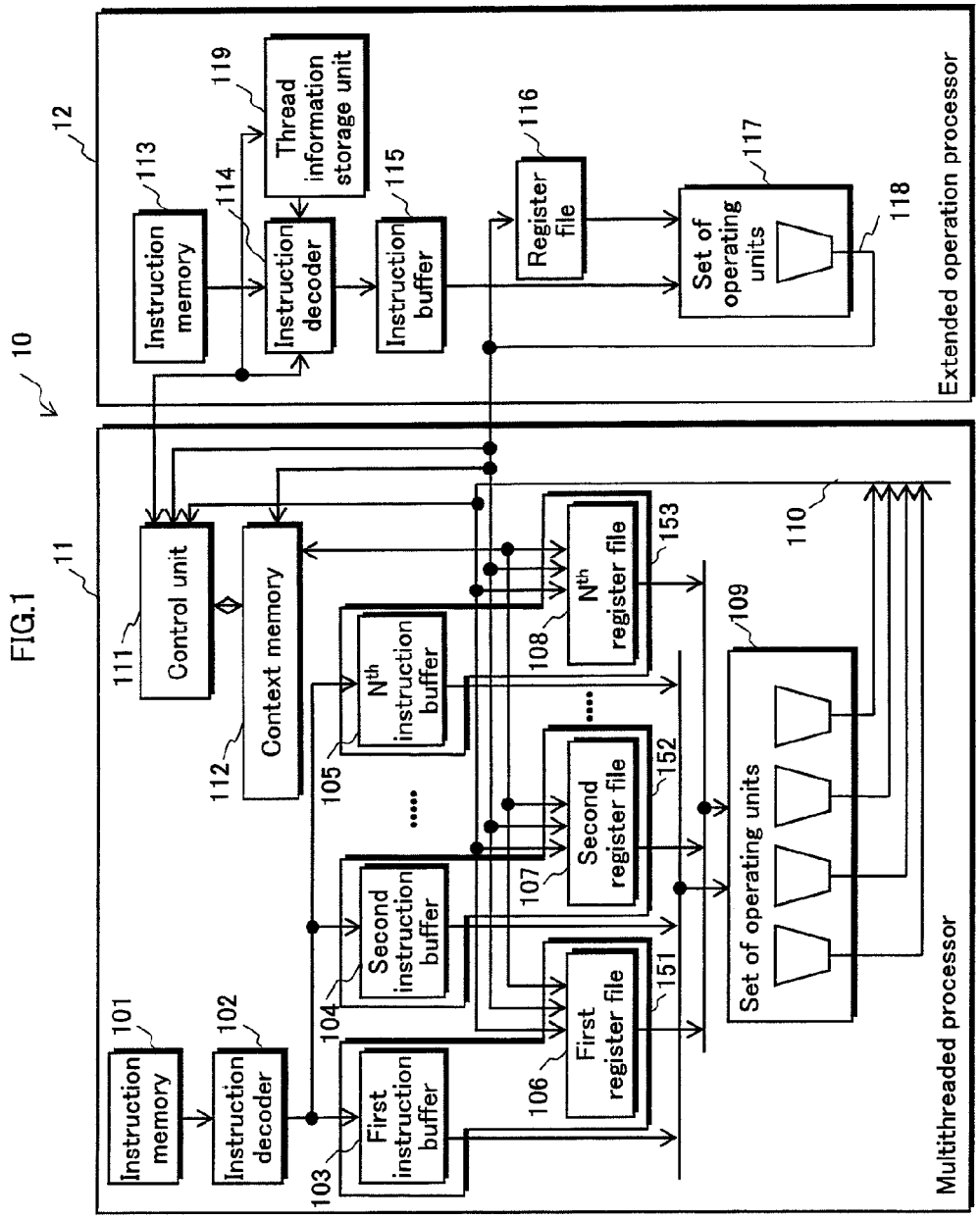
FIG. 1 shows a structure of a multiprocessor system 10.

FIG. 1 shows a structure of a multiprocessor system 10 in the first embodiment of the present invention.

The multiprocessor system 10 is composed of a multithreaded processor 11 and an extended operation processor 12.

The multithreaded processor 11 is a processor that simultaneously executes a maximum of N instruction streams (N being an integer equal to or greater than two) (N number of threads) separately.

The extended operation processor 12 is started by control made by the multithreaded processor 11, and is a processor that performs processing according to an instruction made by the threads being executed in the multithreaded processor 11.

The following describes structures of the processors.

(1) Structure of Multithreaded Processor 11

As shown in FIG. 1, the multithreaded processor 11 is composed of an instruction memory 101, an instruction decoder 102, N instruction buffers (a first instruction buffer 103, a second instruction buffer 104, . . . , and an $N^{th}$ buffer 105), N register files (a first register file 106, a second register file 107, . . . , and an $N^{th}$ register file 108), a set of operating units 109, a write-back bus 110, a control unit 111 and a context memory 112.

The instruction buffers are corresponded one-to-one with the register files. Pairs of the instruction buffers and the register files compose N logical processors in one-to-one correspondence. In the first embodiment, a first logical processor 151 is composed of the first instruction buffer 103 and the first register file 106, a second logical processor 152 is composed of the second instruction buffer 104 and the second register file 107, and an $N^{th}$ logical processor 153 is composed of the $N^{th}$ instruction buffer 105 and the $N^{th}$ register file 108.

The multithreaded processor 11 realizes a parallel execution of the maximum of N threads by allocating each of the maximum of N threads from among a plurality of threads to a different logical processor.

(1-1) Instruction Memory 101

The instruction memory 101 holds therein a plurality of instruction streams (threads) each executed by one of the N logical processors.

(1-2) Instruction Decoder 102

The instruction decoder 102 reads one or more instructions that belong to one or more threads to be executed from the instruction memory 101, decodes the instructions, and writes each of the instructions in one of the instruction buffers to which a thread that has made the one instruction is allocated. The one instruction buffer is included in one of the logical processors.

(1-3) First Instruction Buffer 103 to $N^{th}$ Instruction Buffer 105

An $i^{th}$ instruction buffer (i being an integer equal to or smaller than one, and this applies to the following) belongs to an $i^{th}$ logical processor, receives an instruction that belongs to a thread allocated to the $i^{th}$ logical processor, and holds therein the instruction.

(1-4) First Register File 106 to $N^{th}$ Register File 108

An $i^{th}$ register file belongs to the $i^{th}$ logical processor, and is a set of registers that holds therein data to be read and written when the instruction held in the $i^{th}$ instruction buffer is executed.

Note that a head address of each register file starts with zero.

(1-5) Set of Operators 109

The set of operating units 109 is a processing unit including a plurality of operating units such as an adder and a multiplier, and performs parallel processing of the logical processors.

(1-6) Write-Back Bus 110

The write-back bus 110 is a bus for writing data outputted from the set of operating units 109 back into the first register file 106 to the $N^{th}$ register file 108.

(1-7) Control Unit 111

The control unit 111 is composed of a thread control unit 160, a thread information storage unit 161 and a processor control unit 162.

(1-7-1) Thread Control Unit 160

The thread control unit 160 manages activation and deactivation of each thread. An active thread is reserved as a resource that occupies the $i^{th}$ logical processor (i.e. the $i^{th}$ instruction buffer and the $i^{th}$ register file), and is a thread that can be executed immediately in the $i^{th}$ logical processor. An inactive thread is a thread that is not reserved as a resource that occupies any logical processor.

The thread control unit 160 performs activation and deactivation of the threads based on factors that cause switching between threads. Here, examples of the factors that cause the switching between threads are a reception of a signal showing that a value corresponding to an execution time of the active thread reaches a predetermined value, a reception of an event generation signal inputted from other hardware and an execution of a predetermined instruction.

Figure 2:
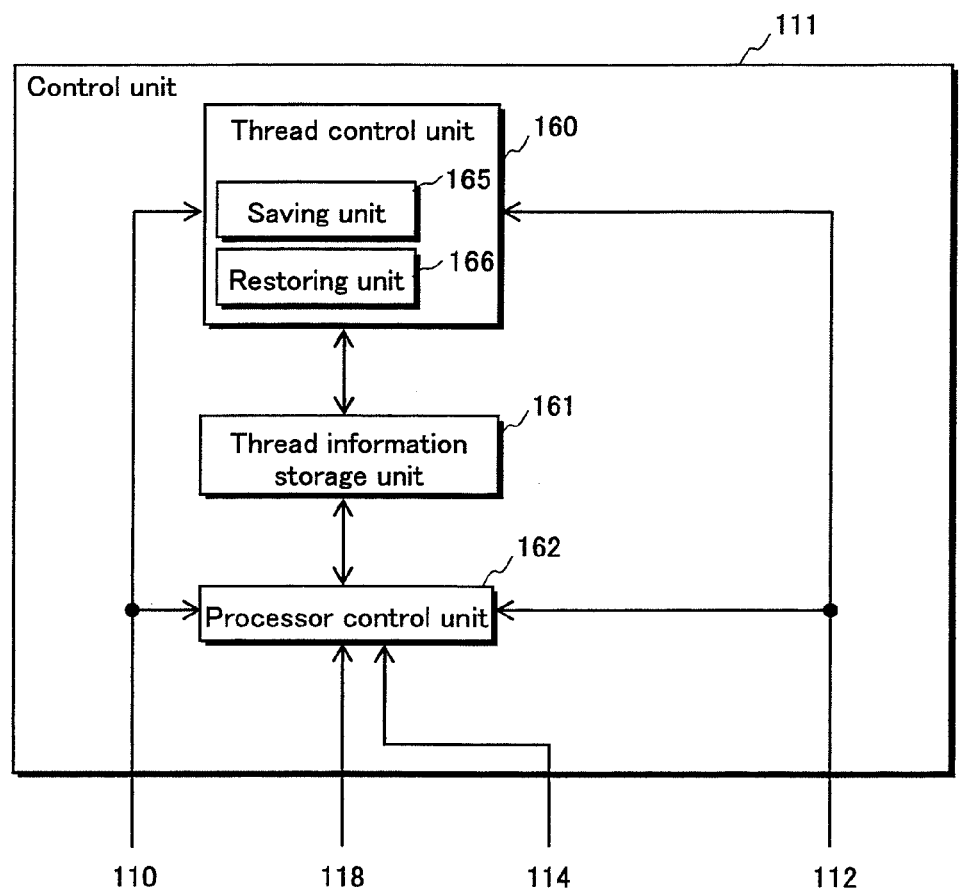
FIG. 2 shows a structure of a control unit 111.

The thread control unit 160 includes a saving unit 165 and a restoring unit 166 as shown in FIG. 2. The thread control unit 160 causes the saving unit 165 to deactivate the thread, and causes the restoring unit 166 to activate the thread.

Upon receiving the signal showing that the value corresponding to the execution time of the active thread reaches the predetermined value, for example, the thread control unit 160 deactivates the thread. Specifically, the saving unit 165 stops: reading of an instruction from the instruction memory 101 holding the thread determined to be deactivated (e.g. a thread executed by the second logical processor); and an instruction issuance by the second instruction buffer 104. Then, the saving unit 165 saves, in a predetermined area of the context memory 112, content included in the second register file 107.

When the inactive thread becomes an execution target again, the thread control unit 160 activates the thread. Specifically, the restoring unit 166 reads, from the context memory 112, the data (value) used by the thread determined to be activated (a thread allocated to the second logical processor), and restores the data in the second register file 107. Subsequently, the thread control unit 160 reads a corresponding instruction from the instruction memory 101, and starts the execution of the corresponding instruction. A management method of data stored in the context memory 112 is described later.

The thread control unit 160 updates an after-mentioned thread information table T100 when activating or deactivating the thread.

(1-7-2) Thread Information Storage Unit 161

Figures 3, 4:
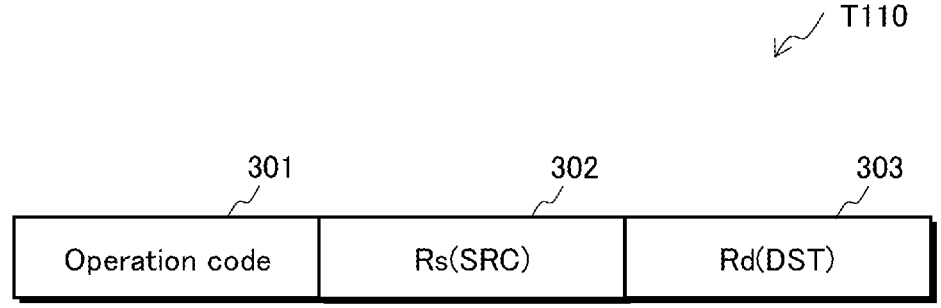
FIG. 3 shows an example of a data structure of a thread information table T100.
FIG. 4 shows an example of a data structure of an operation end control instruction T110.

The thread information storage unit 161 manages a state of each thread, and includes the thread information table T100 as shown in FIG. 3.

The thread information table T100 includes an area for storing a plurality of sets (entries) each of which is composed of a thread ID 201, a valid flag 202, a logical processor ID 203, a thread state flag 204 and a base address 205. Here, the number of entries corresponds to the number of threads.

The thread ID 201 is an ID number showing which thread information held in each entry corresponds to which thread.

The valid flag 202 is a valid bit showing whether the thread information held in each entry is valid or not. Here, "0" indicates invalid information and "1" indicates valid information.

The logical processor ID 203 is an ID number showing in which logical processor the thread information held in each entry is executed. For example, a value "00" of the logical processor ID shows the first logical processor 151, and a value "01" of the logical processor ID shows the second logical processor 152.

The thread state flag 204 is information showing a thread state held in each entry. "00" shows an inactive state, "01" shows an active state and "10" or "11" shows that the thread is part way through an activation process or a deactivation process. Note that the thread control unit 160 updates the thread state flag 204 when the thread control unit 160 changes the state of the thread from the active state to the inactive state, or changes the state of the thread from the inactive state to the active state. For example, the saving unit 165 changes the state of the thread from the active state to the inactive state, and the restoring unit 166 changes the state of the thread from the inactive state to the active state.

The base address 205 shows an address of the context memory 112, and is a head part of a register value for the thread corresponding to the thread ID held in the entry.

The entry 206 shows that a thread 1 whose thread ID is "00001" is valid and that the thread is being executed in the first logical processor 151 according to the current logical processor ID of "00" and the current thread state flag.

Also, the entry 208 shows that a thread 3 whose thread ID is "00011" is valid and is currently in an active state.

Note that the thread control unit 160 updates the thread information table T100 as described in the above. For example, when the state of the thread 1 changes from the active state to the inactive state, the saving unit 165 updates the thread state flag corresponding to the thread 1 whose thread ID is "00001" by changing it from "00" to "10" showing that the thread state is being changed. Upon completion of the change, the saving unit 165 updates the thread state flag by changing it from "10" to "01" showing that the thread is in the inactive state. When the thread state changes from the inactive state to the active state, on the other hand, the restoring unit 166 updates the thread state flag of the thread 1 by changing it from "01" to "11" showing that the thread is being changed in order to show that the thread state is being changed. Upon completion of the change, the restoring unit 166 updates the thread state flag by changing it from "11" to "00".

Furthermore, when the thread 3 is allocated to the logical processor (here, the first logical processor) for the first time, for example, the thread control unit 160 adds an entry corresponding to the thread 3. In such a case, the entry includes a thread ID "00011", a valid flag "1", a logical processor ID "00", a thread state flag "01" and a base address "0x4000000".

(1-7-3) Processor Control Unit 162

The processor control unit 162 makes a processing request to the extended operation processor 12 according to an instruction of one of the thread being executed. Specifically, the processor control unit 162 makes the processing request to the extended operation processor 12 according to the instruction executed by the operating unit executing the instruction made by the thread allocated to one of the logical processors. Also, the processor control unit 162 acquires, from the thread information table T100, the thread ID that identifies the one thread that has made the processing request, and outputs the acquired thread ID to the extended operation processor 12.

Subsequently, upon receiving a writing request to the thread that has made the processing request to the extended operation processor 12, the processor control unit 162 acquires a thread ID of the thread that has made the processing request from the extended operation processor 12. The processor control unit 162 is notified of the writing request when the extended operation processor 12 executes an operation end control instruction T110. Note that the operation end control instruction T110 is described in detail later.

The processor control unit 162 refers to the thread state flag included in the entry including the acquired thread ID with use of the thread information table T100, and judges whether or not the thread is allocated with the logical processor as an execution target (i.e. whether or not the thread is in the active state or the inactive state).

When judging that the thread is in the inactive state, the processor control unit 162 performs control such that data to be written that is outputted from the extended operation processor 12 is written into the address of the context memory 112. The address of the context memory 112 is specified by the base address included in the entry and the register specified in the extended operation processor 12. Note that the writing into the context memory 112 is realized by an execution of the hardware in parallel to an execution of the currently active thread without affecting the execution. Such an operation prevents a decrease in execution efficiency caused by unnecessarily cutting time for executing the active thread.

When judging that the thread is in the active state, the processor control unit 162 performs control such that the data to be written that is outputted from the extended operation processor 12 is written into an address that has been specified by the extended operation processor 12 and is included in a register file of the logical processor to which the thread corresponding to the thread ID is allocated.

The following describes a data structure of the operation end control instruction T110 executed in the extended operation processor 12.

FIG. 4 shows a format of the operation end control instruction T110 in the first embodiment. The operation control instruction T110 is composed of an operation code 301, a first operand 302 and a second operand 303.

The operation code 301 is a code instructing the processor to complete an execution of a thread (of the extended operation processor 12) being executed, and to transfer data included in the register file of the thread (of the extended operation processor 12) to the register file of the other thread (thread that has made the request).

The first operand 302 specifies a register included in the register file used by the self-owned thread (of the extended operation processor) as a data transfer source.

The second operand 303 specifies a register included in the register file used by the other thread (thread that has made the request) as a data transfer destination. Note that the second operand 303 indicates the register by the register number.

When the thread that has made the request is in the active state, the processor control unit 162 performs control such that data (value) stored in the register specified by the first operand 302 is written into the register that is specified by the second operand 303, and is included in the file register included in the logical processor.

When the thread that has made the request is in the active state, the processor control unit 162 controls at first such that the base address is specified that is associated with the thread that has made the request, according to the entry including the acquired thread ID with use of the thread information table T100. An address of the register file (included in the context memory 112) into which the thread is to be written is specified according to the specified base address and a value (Rd) specified by the second operand 303. For example, when the base address is stored in four bytes and each register is four bytes in size, the address is specified by an equation "base address+(second operand×4)". The data (value) stored in the register specified by the first operand 302 is written into the register specified by the address stored in the context memory 112.

Figure 5:
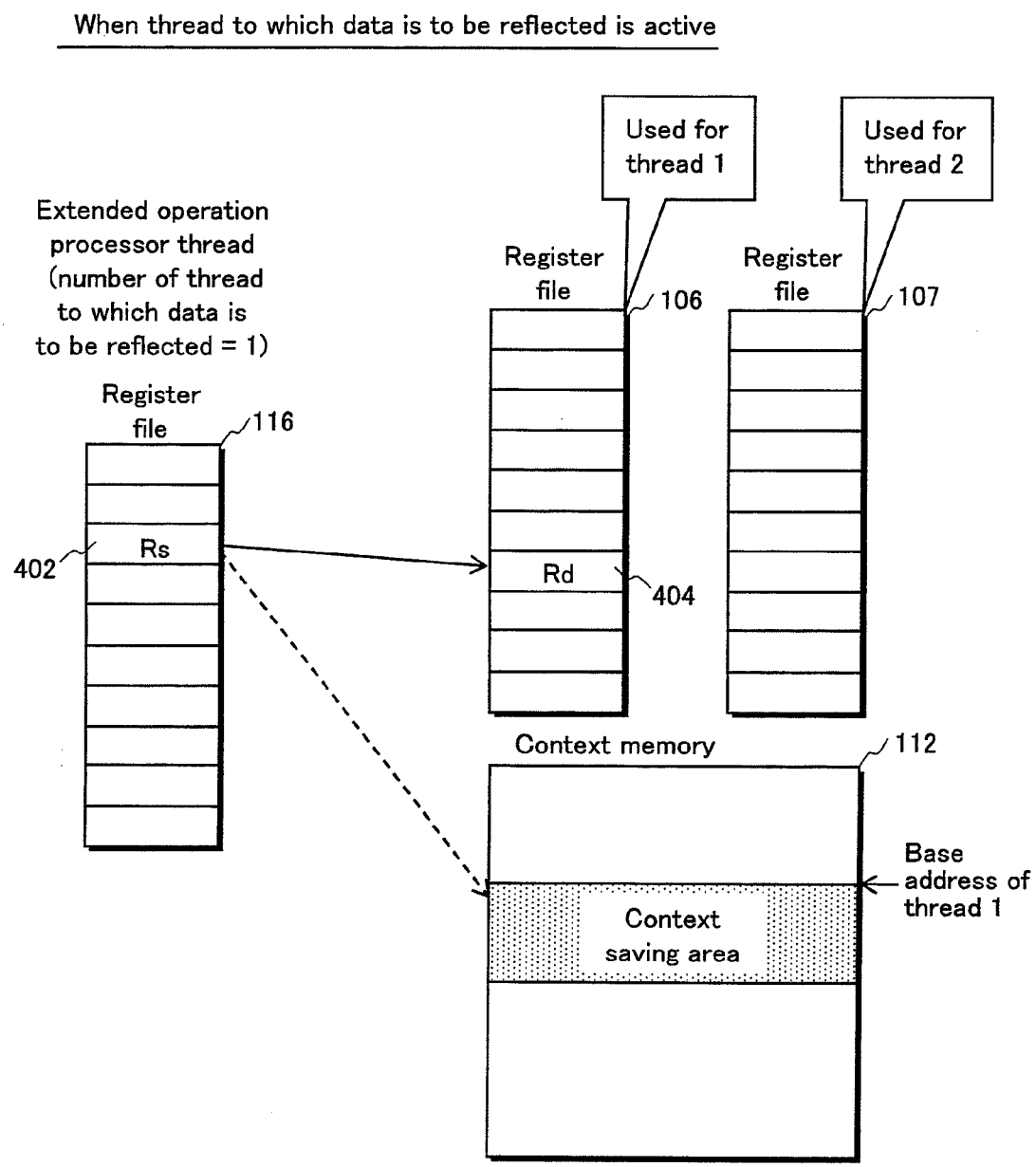
FIG. 5 shows a writing location of data when a thread to which the data is to be reflected is active.
Figure 6:
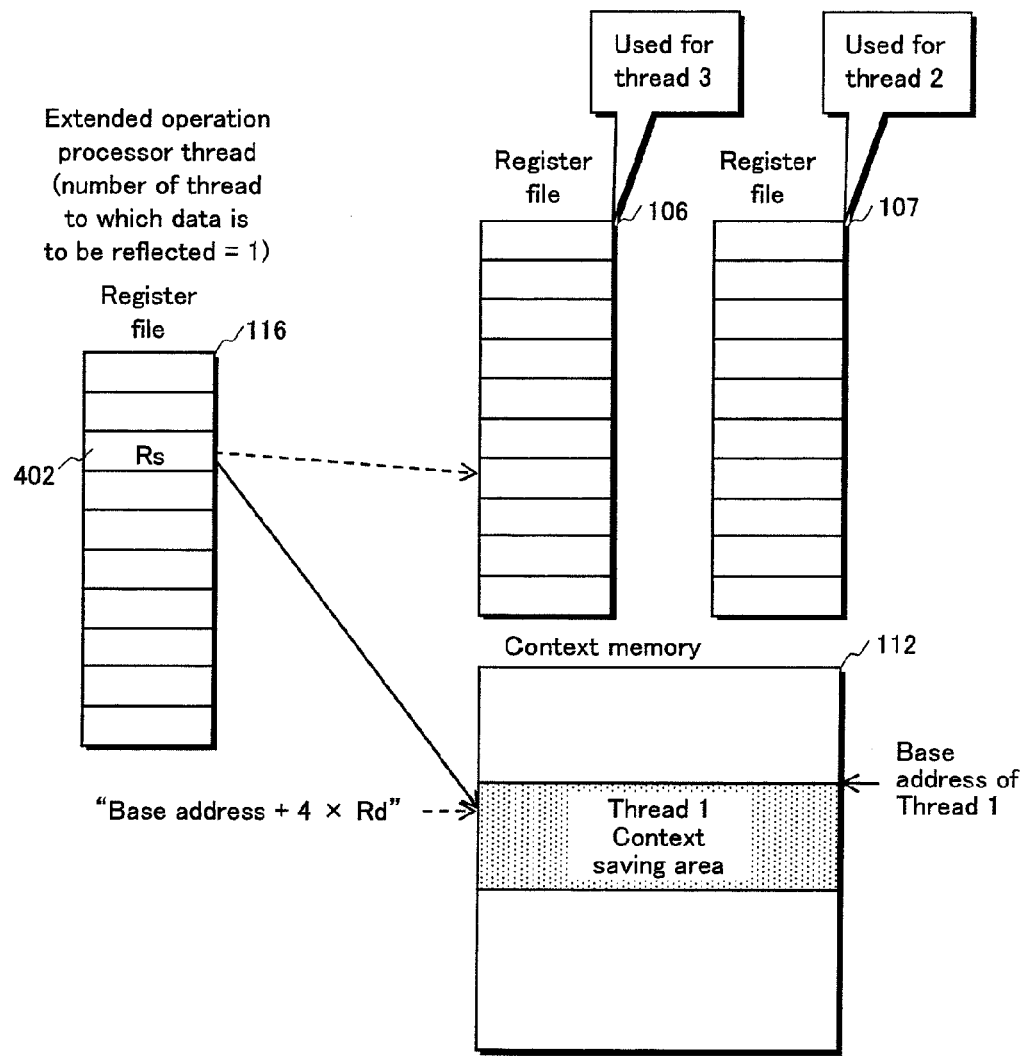
FIG. 6 shows a writing location of data when a thread to which the data is to be reflected is inactive.

Each of FIG. 5 and FIG. 6 shows an operation when the operation end control instruction T110 in the first embodiment is executed (issued). Note that, for descriptive convenience, the multithreaded processor 11 includes only the register files 106 and 107, the thread 1 makes a processing request to the extended operation processor 12, and the threads 1 and 2 are respectively allocated to the register files 106 and 107 when the processing request is made.

When a thread completion instruction is issued by the extended operation processor 12, and a thread to which the result should be reflected (in this case, the thread 1) (i.e. the thread 1 that has made the processing request to the extended operation processor 12) is active, a value stored in a register Rs 402 that has been specified by the first operand 302 and is included in the register file 116 is transferred to (written into) the register Rd 404 that has been specified by the second operand 303 and is included in the register file 106 occupied by the thread 1 that has made the processing request, as shown in FIG. 5.

Also, when the thread to which the result should be reflected (in this case, thread 1) is inactive in the multithreaded processor 11 (e.g. when the register files 106 and 107 are occupied by the threads 3 and 2, respectively), it can be seen from FIG. 6 that the processor control unit 162 performs control such that a storage location address of the context memory 112 is specified by the base address of the context memory 112 that has been associated with the thread 1 that has made the processing request and the register Rd 404 specified by the second operand 303. A value stored in the register Rs 402 that has been specified by the first operand 302 and is included in the register file 116 is transferred to (written into) the specified address.

(1-8) Context Memory 112

The context memory 112 is a memory for saving content of the register set including the inactive thread. In the context memory 112, a different area is allocated to each of the threads.

The area allocation is realized by associating a different address with each of the threads as a base address.

(2) Structure of Expanded Operation Processor 12

As shown in FIG. 1, the extended operation processor 12 includes an instruction memory 113, an instruction decoder 114, an instruction buffer 115, a register file 116, a set of operating units 117, a write-back bus 118 and a thread information storage unit 119.

(2-1) Instruction Memory 113

The instruction memory 113 is a memory that holds therein an instruction executed in the extended operation processor 12.

(2-2) Instruction Decoder 114

The instruction decoder 114 is a processing unit that reads an instruction from the instruction memory 113, decodes the instruction and writes the instruction into the instruction buffer 115.

After issuing (executing) the operation end control instruction T110 by decoding the instruction, the instruction decoder 114 writes the issued operation end control instruction T110 in the instruction buffer 115, and notifies a writing request to the processor control unit 162 included in the multithreaded processor 11.

(2-3) Instruction Buffer 115

The instruction buffer 115 is a storage unit that receives an instruction from the instruction decoder 114 and stores therein the instruction.

The register file 116 is a set of registers that holds therein data to be read and written when the instruction held in the instruction buffer 115 is executed.

Note that a head address of the register file 116 starts with zero.

(2-4) Set of Operating Units 117

The set of operating units 117 is a processing unit including a plurality of operating units such as an adder and a multiplier, and executes an instruction held in the instruction buffer 115.

After reading the operation end control instruction T110 from the instruction buffer 115, the set of operating units 117 reads a value of the register Rs that has been specified by the first operand 302 and is included in the read operation end control instruction T110, and outputs, to the multithreaded processor 11, the read value and the instruction for writing the read value in the register Rd specified by the second operand 302, via the write-back bus 118. Note that the write-back bus 118 is described later.

At this time, when the extended operation processor 12 outputs these pieces of information, the processor control unit 162 included in the multithreaded processor 11 performs control such that the output value is written into a writing location specified by an address thereof based on the previously-performed judgment.

(2-5) Write-back Bus 118

The write-back bus 118 is a bus for writing the data outputted from the set of operating units 117 back in the register file 116 and the first register file 106 to the $N^{th}$ register file 108 and for writing content included in the register file 116 in the first register file 106 to the $N^{th}$ register file 108 or the context memory 112.

(2-6) Thread Information Storage Unit 119

The thread information storage unit 119 has an area for storing therein a thread ID that identifies a thread that has made a processing request.

The processor control unit 162 included in the multi-threaded processor 11 performs the writing to the thread information storage unit 119.

1. 2 Operation

Figure 7:
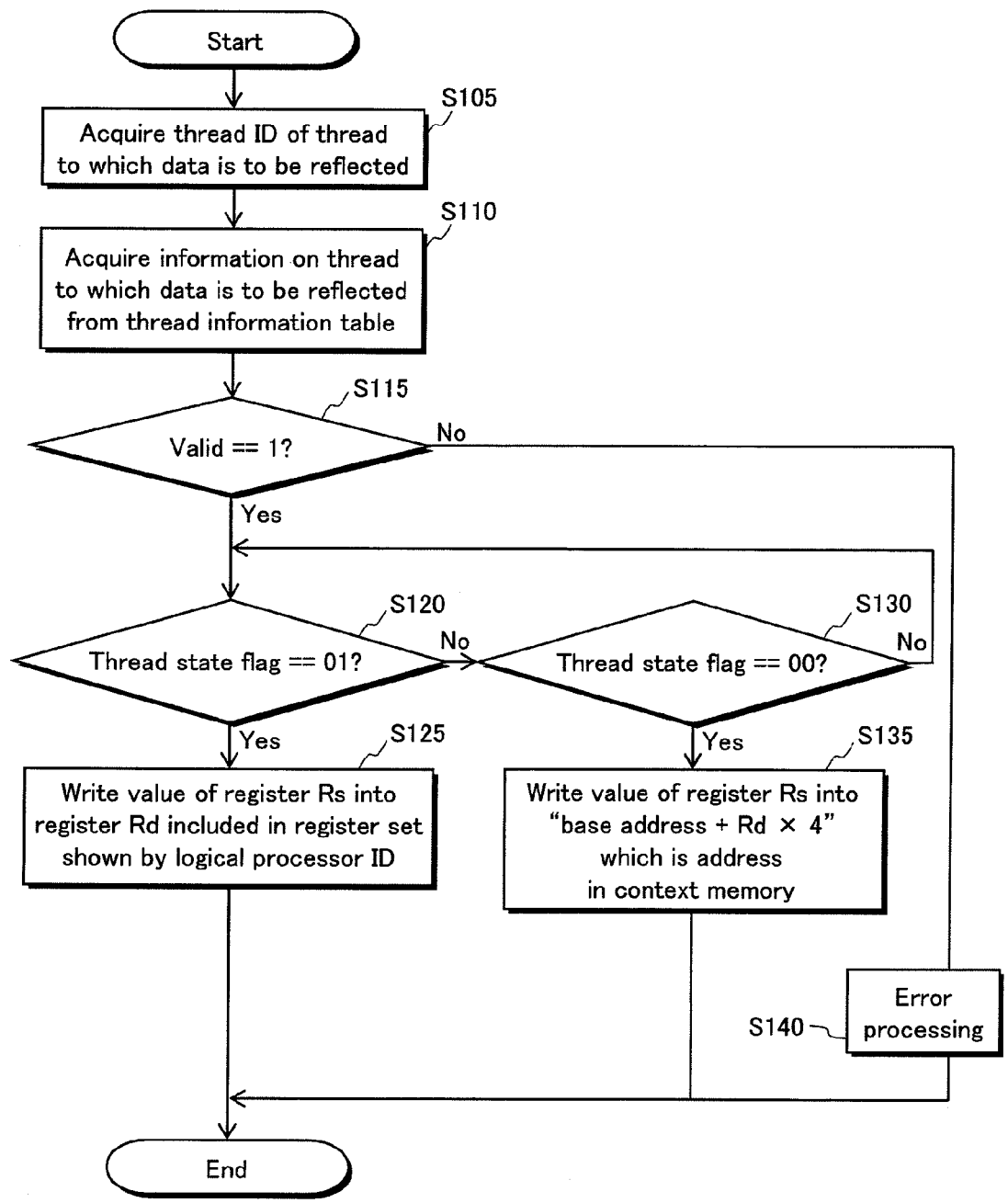
FIG. 7 shows an operation flow of the processing when the operation end control instruction T110 is executed.

An operation of the multiprocessor system 10 when the operation end control instruction T110 is executed is described using a flowchart shown in FIG. 7.

When the operation end control instruction T110 is issued by the extended operation processor 12, the processor control unit 162 included in the multithreaded processor 11 acquires a thread ID of the thread to which data is to be reflected (i.e. a thread ID of the thread that has made the processing request) from the thread information storage unit 119 (Step S105).

The processor control unit 162 reads an entry in which information on the thread ID of the thread to which data is to be reflected in the thread information table T100 is recorded (Step S110).

The processor control unit 162 judges whether or not content of the valid flag 202 included in the read entry is one or not (Step S115).

When judging that the content is not one ("No" in Step S115), the multiprocessor system 10 performs error processing (Step S140), and ends the processing. The error processing is, for example, to delete content stored in the register file 116, the instruction held in the instruction buffer and the instruction being executed in the extended operation processor 12.

When judging that the content is one ("Yes" in Step S115), the processor control unit 162 judges whether or not the thread state flag 204 included in the read entry shows 01 (Step S120).

When judging that the thread state flag 204 shows 01 ("Yes" in Step S120), the processor control unit 162 perform control such that content of the register Rs that has been specified by the first operand 302 and is included in the register file 116 of the extended operation processor 12 is written in the register Rd that has been specified by the second operand 303 and is included in the register file included in the logical processor indicated by the logical processor ID 203 included in the read entry (Step S125).

When judging that the thread state flag 204 does not show "01" ("No" in Step S125), the processor control unit 162 judges whether or not the thread state flag 204 shows "00" (Step S130).

When judging that the thread state flag 204 shows "00" ("Yes" in Step S130), the processor control unit 162 transfers the content of the register Rs that has been specified by the first operand 302 and is included in the register file 116 included in the extended operation processor 12 to the address of the context memory 112 calculated based on the base address 205 included in the read entry and the register Rd specified by the second operand 303, and completes the execution of the thread completion instruction (Step S135).

When judging that the content of the thread state flag 204 is not 00 ("No" in Step S130), the processor control unit 162 returns to processing in Step S120, and waits for an update of the thread state.

1.3 Conclusion of First Embodiment

Figure 8:
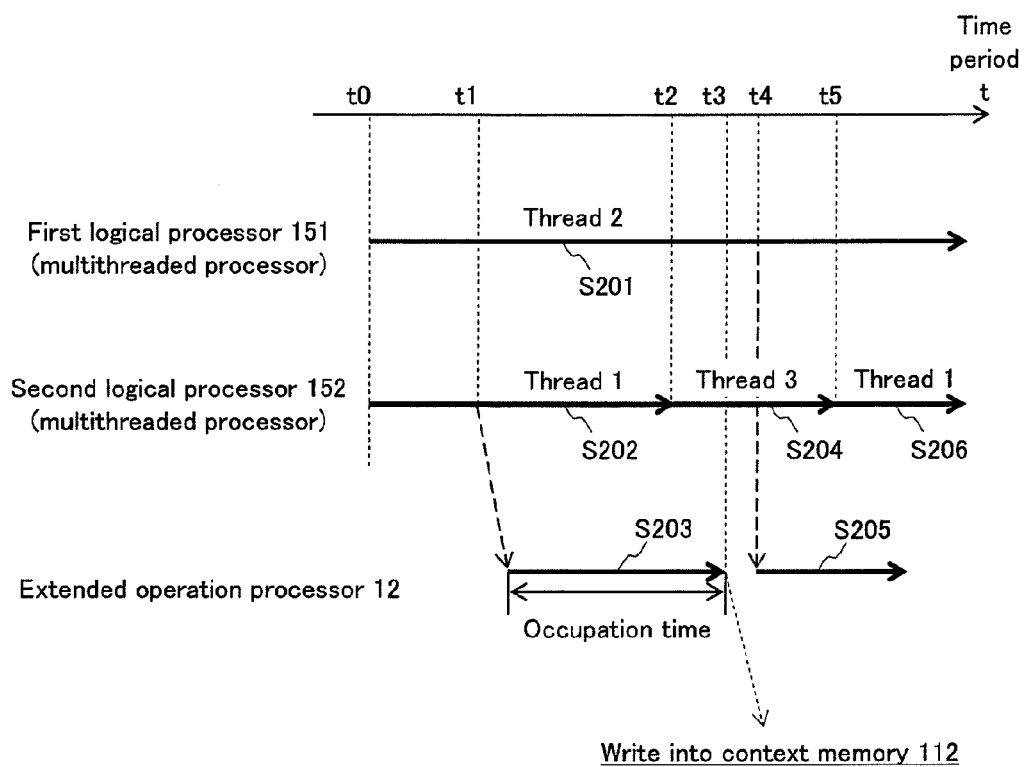
FIG. 8 shows a specific example of an operation when a plurality of threads are executed.

FIG. 8 shows an operation of a plurality of threads in the first embodiment of the present invention. Note that the number of logical processors is two.

In a time period t0, the threads 2 and 1 are executed in the first logical processor 151 and the second logical processor 152, respectively (Step S201 and Step S202).

In a time period t1, a processing request is made by the thread 1 to the extended operation processor 12. Upon receiving the processing request, the extended operation processor 12 performs processing according to the processing request made by the thread 1 (Step S203).

In a time period t2, the thread 1 becomes inactive, and the thread 3 is executed by the second logical processor 151 (Step S204). Upon completion of the processing by the extended operation processor 12 in a time period t3 in which the thread 3 is executed, a processing result is written into the context memory since the thread 1 is inactive.

Subsequently, when a processing request is made by the thread 2 to the extended operation processor 12 in a time period t4 in which the thread 3 is executed, the extended operation processor 12 is freed from the processing relating to the request made by the thread 1 (i.e. the extended operation processor 12 is not occupied by the thread 1). Therefore, the extended operation processor 12 performs processing according to the request made by the thread 2 (Step S205).

When the thread 1 becomes active again in a time period t5 after the execution of the thread 3 is completed, the processing according to the request made by the thread 1 continues with use of data held in the context memory 112 since a result of the processing by the extended operation processor 12 is written in the context memory 112 (Step S206).

Thus, when the extended operation processor 12 completes the processing according to the request made by the thread 1, the multiprocessor system 10 in the first embodiment writes the processing result (data) in an area which is associated with the thread 1 by the above-mentioned operation end control instruction T110 and is included in the context memory 112 even if the thread 1 in which data is to be written is not active. Thus, the multiprocessor system 10 can immediately completes the processing. Therefore, an operation resource can be efficiently used without causing an unnecessary queuing time to occur.

According to the multiprocessor of the present embodiment, when ending the processing relating to the thread by the extended operation processor 12 together with transferring the data which is the processing result to the other thread (that has made the processing request), the multiprocessor appropriately selects a data transfer location according to the state of the thread (i.e. whether or not a thread at a data receiving side is active or not). Therefore, data transfer between threads can be efficiently performed.

2. Second Embodiment

A second embodiment is different from the first embodiment in data structure of the operation end control instruction field.

The following describes differences in a structure of an instruction field and an operation flowchart between the second embodiment and the first embodiment. Note that the same reference numerals are given to elements that are the same as the elements of the first embodiment.

2.1 Regarding Operation End Control Instruction 120

Figure 9:
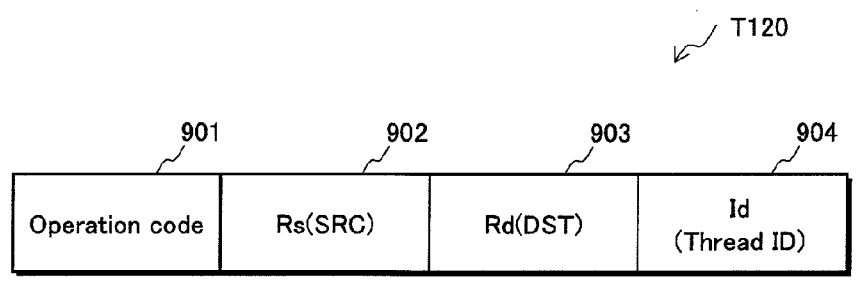
FIG. 9 shows an example of a data structure of an operation end control instruction T120.

FIG. 9 shows a format of an operation end control instruction T120 in the second embodiment of the present invention.

The operation end control instruction T120 is composed of an operation code 901, a first operand 902, a second operand 903 and a third operand 904.

Since the operation code 901, the first operand 902 and the second operand 903 are respectively the same as the operation code 301, the first operand 302 and the second operand 303 in the first embodiment, the description thereof is omitted.

The third operand 904 specifies a thread ID having a register specified by the second operand 903 (i.e. thread ID of the thread that has made a processing request).

2. 2 Structure

The following describes a multiprocessor system 1000 in the second embodiment.

Figure 10:
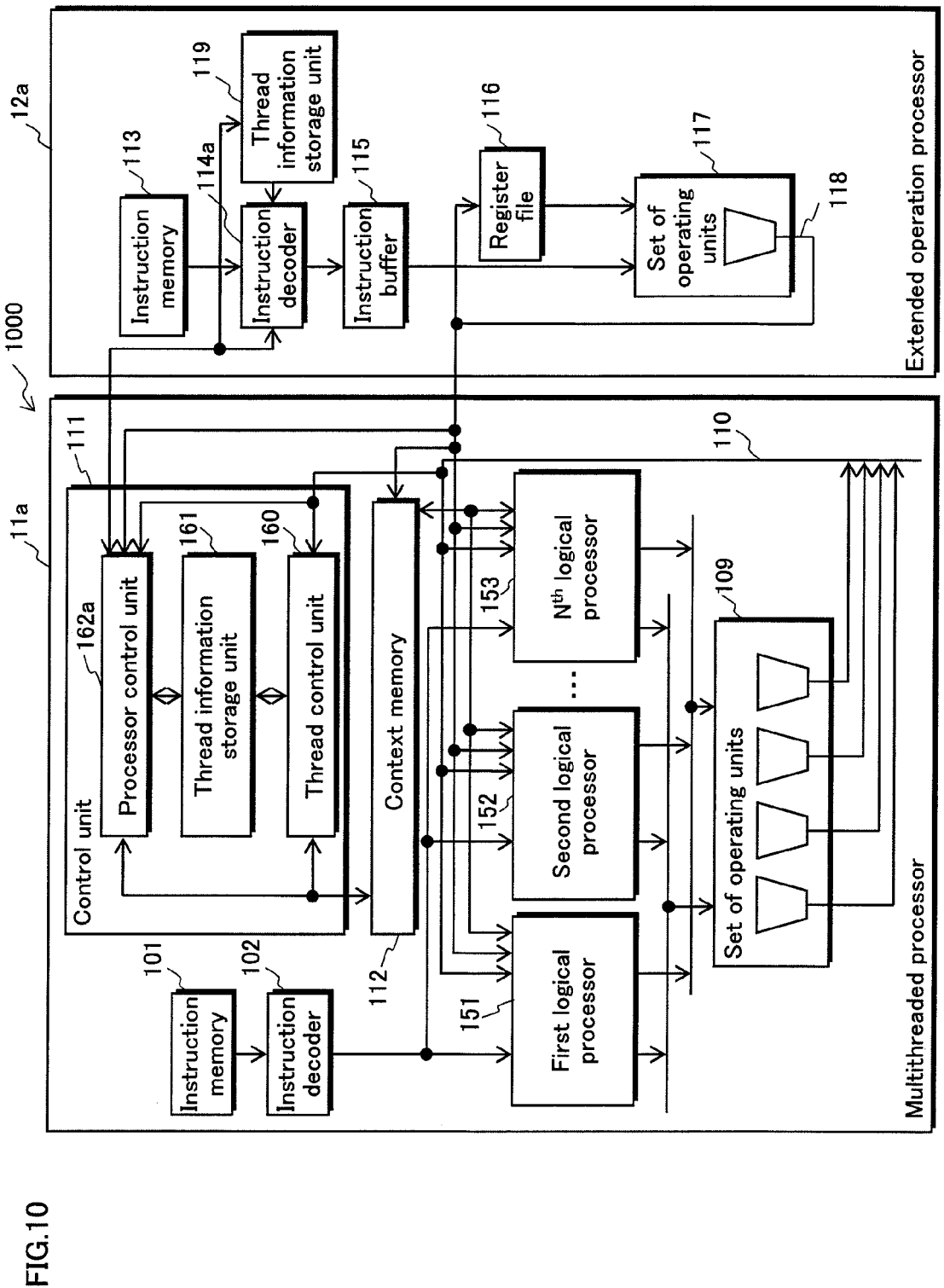
FIG. 10 shows a structure of a multiprocessor system 1000.

The multiprocessor system 1000 is composed of a multi-threaded processor 11a and an extended operation processor 12a as shown in FIG. 10.

In the second embodiment, an instruction decoder and a processor control unit are different from those of the first embodiment. The following describes an instruction decoder 114a and a processor control unit 162a in the second embodiment as shown in FIG. 10. Since the elements having the same reference numerals as the first embodiment are described in the first embodiment, the description thereof is omitted. Note that the first logical processor 151 shown in FIG. 10 includes the first instruction buffer 103 and the first register file 106 as with the first embodiment although these elements are not depicted in FIG. 10. Similarly, each of the second logical processor 152 and the N$^{th}$ logical processor 153 includes the instruction buffer and the register file shown in the first embodiment. The thread control unit 160 includes the saving unit 165 and the restoring unit 166 as with the first embodiment although these elements are not depicted in FIG. 10.

(1) Instruction Decoder 114a

After issuing the operation end control instruction T120 by decoding an instruction, the instruction decoder 114a acquires the thread ID from the third operand. The instruction decoder 114a writes the issued operation end control instruction T120 in the instruction buffer 115, and notifies a writing request including the acquired thread ID to the processor control unit 162 included in the multithreaded processor 11.

(2) Processor Control Unit 162a

As with the first embodiment, the processor control unit 162a notifies the extended operation processor 12 of the processing request to the extended operation processor 12 and the thread ID of the thread that has made the processing request according to the instruction of one of the threads to be executed. At this time, the thread ID is written in the thread information storage unit 119.

Subsequently, upon receiving the writing request including the thread ID from the extended operation processor 12, the processor control unit 162a refers to a thread state flag included in an entry including the thread ID included in the received writing request, and judges whether or not a thread corresponding to the thread ID is allocated to the logical processor as an execution target (i.e. whether the thread is active or inactive). Since the subsequent operations are the same as the first embodiment, the description thereof is omitted.

2. 3 Operation

The following describes only what is different from FIG. 7 of the first embodiment regarding the operation of the multiprocessor system 10 when the operation end control instruction T120 is executed.

Changes made to the operation of Step S105 are shown below.

When the operation end control instruction T120 is executed in the extended operation processor 12, the thread ID included in the operation end control instruction T120 is acquired from the third operand 904.

Since the subsequent operations are the same as the operations from Step S110 to Step S140 shown in FIG. 7, the description thereof is omitted.

2. 4 Conclusion of Second Embodiment

In the second embodiment, an acquisition method of the thread ID showing the thread for the judgment on whether the thread is active or inactive is different from the first embodiment. However, the same effect as the first embodiment is obtained in the second embodiment.

3. Third Embodiment

The following describes a case where the multiprocessor system 10 shown in the first embodiment is applied for decoding and encoding processing of video as a concrete example of a system to which the multiprocessor system 10 is applied.

Figure 11:
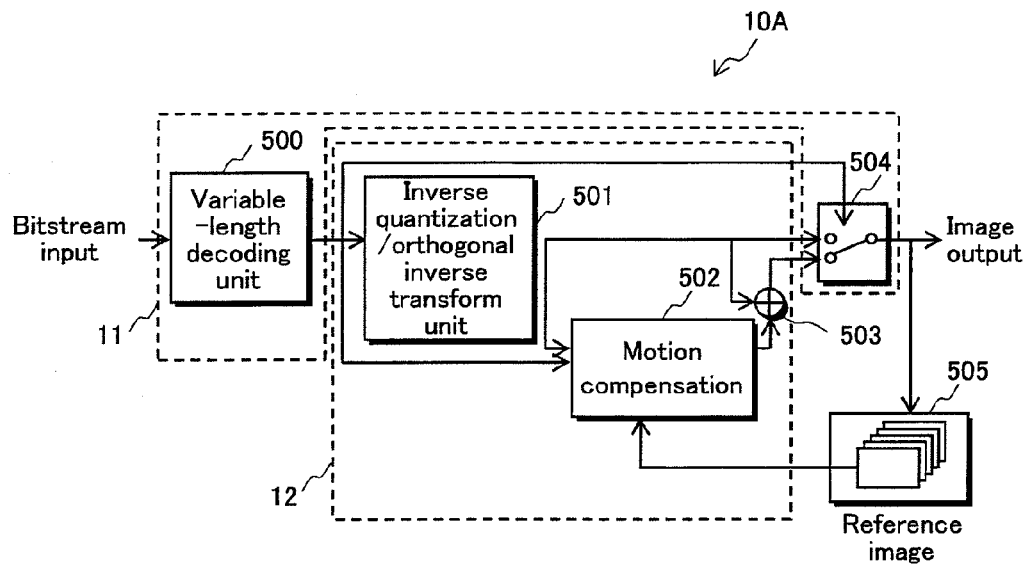
FIG. 11 shows an example when the multiprocessor system 10 is applied to a decoder 10A.

FIG. 11 shows a case where the multiprocessor system 10 is applied to a decoder 10A that performs the decoding processing.

Figure 12:
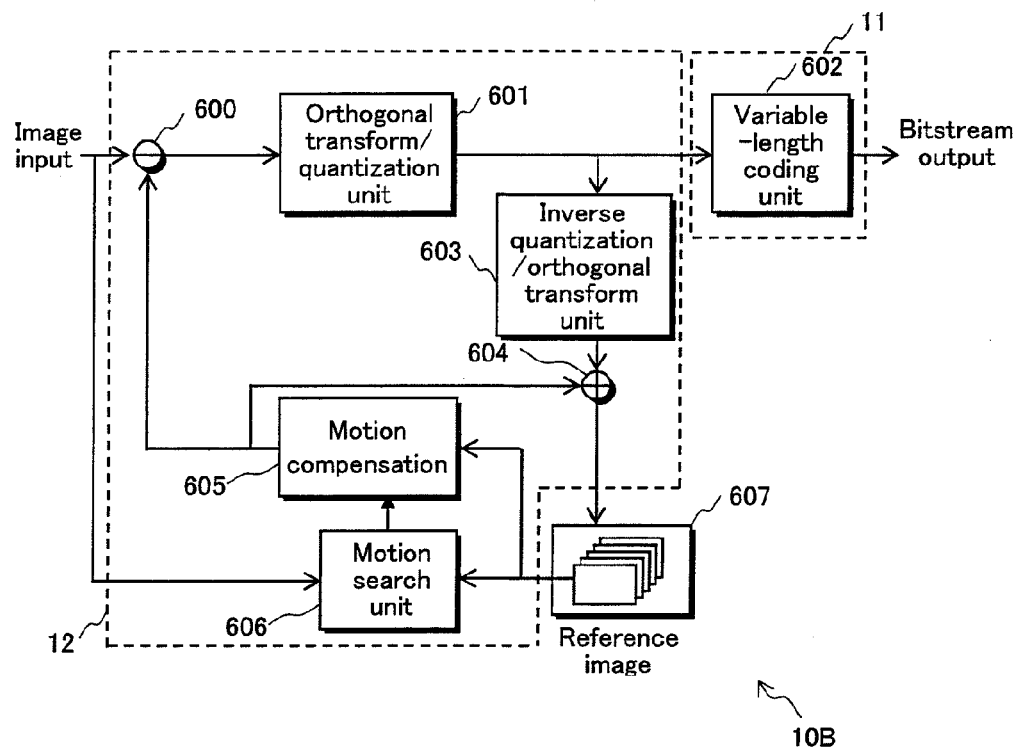
FIG. 12 shows an example when the multiprocessor system 10 is applied to an encoder 10B.
Figure 13:
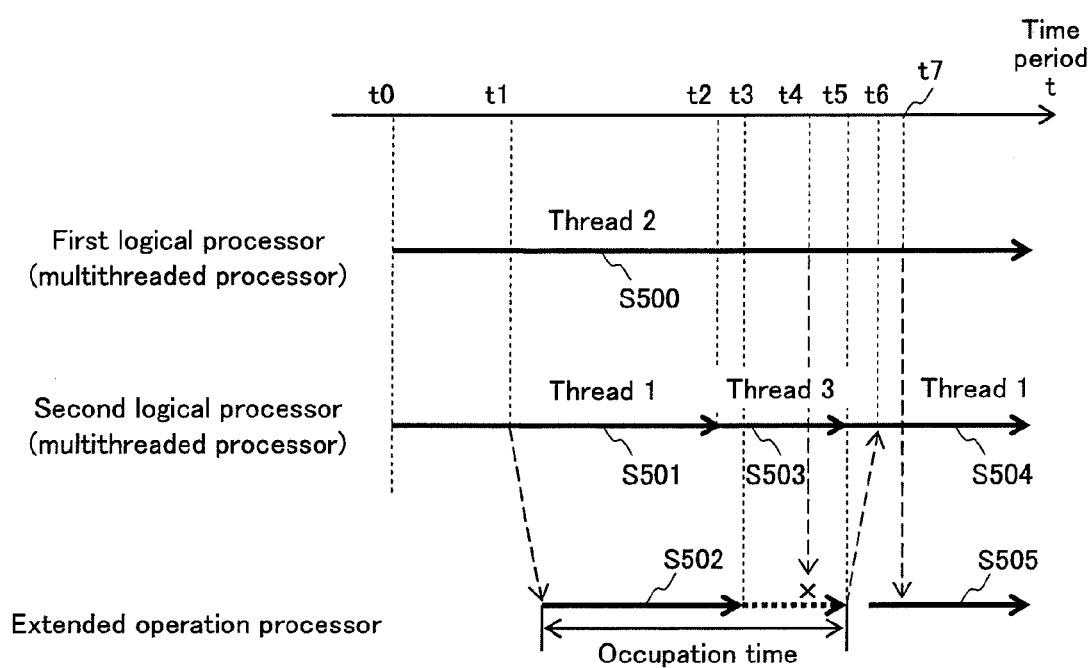
FIG. 13 shows a specific example of an operation when a plurality of threads are executed.

FIG. 12 shows a case where the multiprocessor system 10 is applied to an encoder 10B that performs the encoding processing.

3. 1 Application to Decoding Processing

As shown in FIG. 11, the decoder 10A is composed of a variable-length decoding unit 500, an inverse quantization/orthogonal inverse transform unit 501, a motion compensation unit 502, an adder 503, a switch 504 and a reference image buffer 505.

Since these elements are known, an outline thereof is described while omitting a detailed description thereof.

The variable-length decoding unit 500 decodes a variable-length coded signal.

The inverse quantization/orthogonal inverse transform unit 501 performs an inverse quantization and an inverse frequency transform on a quantized DCT coefficient acquired by the variable-length decoding unit 500.

The motion compensation unit 502 generates image data with use of a motion vector.

The adder 503 generates image data to be output by adding the image data obtained by the motion compensation unit 502 to image data obtained in the inverse quantization/orthogonal inverse transform unit 501.

The switch 504 switches a connection with the inverse quantization/orthogonal inverse transform unit 501 and a connection with the adder 503 according to a type of a picture (P, I or B picture) to be decoded that has been obtained by the variable length decoding unit 500.

The reference image buffer 505 holds therein the reference image.

As shown in FIG. 11, the multithreaded processor 11 shown in the first embodiment performs the processing relating to the variable-length decoding unit 500 and the switch, and the extended operation processor 12 performs processing relating to the inverse quantization/orthogonal inverse transform unit 501, the motion compensation unit 502 and the adder 503. This allows the multiprocessor system 10 shown in the first embodiment to be applied to the decoder that performs the decoding processing.

3. 2 Application to Encoding Processing

As shown in FIG. 12, the encoder 10B is composed of a subtraction unit 600, an orthogonal transform/quantization unit 601, a variable-length coding unit 602, an inverse quantization/orthogonal inverse transform unit 603, an adder 604, a motion compensation unit 605, a motion search unit 606 and a reference image buffer 607.

Since these elements are known, an outline thereof is described while omitting a detailed description thereof.

The subtraction unit 600 calculates an error prediction for the image data to be coded.

The orthogonal transform/quantization unit 601 performs frequency transform and quantization for the error prediction.

The variable-length coding unit 602 performs variable-length coding on a quantized DCT coefficient and a motion vector.

The inverse quantization/orthogonal inverse transform unit 603 performs inverse quantization and inverse frequency transform on the quantized DCT coefficient for the motion compensation prediction.

The adder 604 generates image data to be held in the reference image buffer 607 as a reference image by adding image data obtained by the motion compensation unit 502 to image data obtained by the inverse quantization/orthogonal inverse transform unit 501, and performing deblocking filter processing on image data obtained as a result of the addition with use of a blocking filter.

The motion compensation unit 605 generates image data with use of a motion vector.

The motion search unit 606 searches for the motion vector by performing the motion compensation prediction.

The reference image buffer 607 holds therein the reference image.

As shown in FIG. 12, the multiprocessor system 10 shown in the first embodiment may be applied to the encoder 10B when the multithreaded processor 11 shown in the first embodiment performs processing relating to the variable-length coding unit 602, and the extended operation processor 12 performs processing relating to the subtraction unit 600, the orthogonal transform/quantization unit 601, an inverse quantization/orthogonal inverse transform unit 603, the adder 604, the motion compensation unit 605 and the motion search unit 606.

3. 3 Conclusion of Third Embodiment

In order to decode a compressed video signal with use of the standard such as H.264, an analysis of bitstreams, decoding processing of the variable-length coded signal, an inverse quantization, an inverse frequency transform, a motion compensation and deblocking filter processing are necessary.

Sequential processing such as the analysis of bitstreams and the decoding processing of the variable-length coded signal can be performed by a general processor (multithreaded processor) at realistic operating frequencies. Pixel processing such as the inverse quantization, the inverse frequency transform, the motion compensation or the deblocking filter processing is preferably performed in a data parallel processor (extended operation processor) that simultaneously performs operations for a plurality of pixels.

Since the data parallel processor requires large data width due to the register set and an operating unit, an operation of the processor can be performed efficiently without increasing a resource of the processor that performs the sequential processing when the data parallel processor is used as an individual extended operation processor.

In the present embodiment, a real-time image processing system can be configured in which the usage efficiency of the extended operation processor is enhanced while suppressing an increase in size of a circuit by adopting the multithreaded processor for the sequential processing, and adopting the extended operation processor for the pixel processing.

4. Modifications

Since each of the above-described embodiments is an example of embodiments of the present invention, the present invention is not limited to the above-described embodiments. Therefore, various changes are possible unless such changes and modifications depart from the scope of the present invention. For example, the following modifications are included in the present invention.

(1) In the above-described embodiments, the extended operation processor 12 may share each of the elements 113 to 117 included in the extended operation processor 12 with the multithreaded processor 11.

(2) In the above-described embodiments, the extended operation processor 12 holds therein the instruction separately from the multithreaded processor 11. However, the present invention is not limited to this.

The extended operation processor 12 may operate according to a request made by a thread (i.e. an instruction from the logical processor).

(3) In the above-described embodiment, the instruction decoder 114 notifies the processor control unit 162 of the writing request. However, the preset invention is not limited to this.

After performing processing based on the operation end control instruction T110, the set of operating units 117 may notify the processor control unit 162 of the writing request when outputting data to the multithreaded processor 11.

Similarly, after performing processing based on the operation end control instruction T120, the set of operating units 117 may notify the processor control unit 162 of the writing request including the thread ID when outputting data to the multithreaded processor 11.

(4) In the above-described embodiments, the operation end control instruction 110 includes a set of the first operand Rs and the second operand Rd. However, the present invention is not limited to this. Therefore, the operation end control instruction T110 may include a plurality of such sets.

Similarly, the operation end control instruction T120 may include a plurality of set, each of which is composed of the first operand Rs and the second operand Rd.

(5) In the above-described embodiments, when the operation end control instruction T110 is executed, the set of operating units 117 outputs, to the multiprocessor 11, the value (processing result) stored in the register Rs specified by the first operand included in the operation end control instruction T110 and the instruction to write the value in the register Rd specified by the second operand. However, the present invention is not limited to this.

The set of operating units 117 may output, to the multithreaded processor 11, the register Rs specified by the first operand included in the operation end control instruction T110 and an instruction to write the value in the register Rd specified by the second operand.

At this time, the processor control unit 162 reads the processing result from the register file 116 based on the address shown by the register Rs included in the received instruction, and specifies a writing location of the read processing result according to the state of the thread that has made the request with use of the register Rd.

Also, in the second embodiment, the above-described instruction includes the thread ID of the thread that has made the request. Here, the thread ID is specified by third operand.

(6) In the above-described embodiment, when the thread is allocated to the logical processor for the first time, the thread control unit 160 adds an entry corresponding to the thread. However, the present invention is not limited to this.

For example, each of the threads may be associated with one of the logical processors in advance. In this case, the entry for each of the threads is registered in the thread information table T100. The valid flag and the thread state flag that are included in each of the entries may have initialization values of "0" and "00", respectively, and the thread control unit 160 may update a value of each of these flags according to a corresponding thread flag.

(8) In the above-described embodiment, the multithreaded processor 11 is one processor that has a plurality of logical processors. However, the present invention is not limited to this.

The multithreaded processor 11 may include a plurality of processor elements.

(9) In the above-described embodiments, the extended operation processor 12 notifies the multithreaded processor 11 of the request pertaining to the writing upon completion of the processing according to the request made by the thread. However, the present invention is not limited to this.

The expended operation processor 12 may notify the multithreaded processor 11 of the request relating to the writing part way through the processing.

(10) In the above-described embodiment, the register is four bytes in size. However, the present invention is not limited to this.

The register may be another value in size (e.g. 16 bytes) In this case, the above-stated equation may be changed to "base address+(second operand×16)".

(11) In the above-described embodiment, the logical processors are executed in parallel. However, the present invention is not limited to this.

For example, the set of operating units 109 may be allocated to only one of the logical processors, and the execution may be a pseudo parallel execution in which such an allocation is changed according to a time slice.

Note that the parallel processing of the present invention includes such pseudo parallel execution.

(12) The present invention may be a method of the above-described technique. Also, the present invention may be a computer program that realizes the method by the computer, or may be a digital signal composed of the computer program.

Also, the present invention may be the computer program or the digital signal recorded on a computer readable recording medium such as a flexible disk, hard disk, CD-ROM, MO, DVD, DVD-ROM, DVD-RAM, BD or a semiconductor memory. Also, the digital signal may be recorded in such a recording medium.

(13) It is also possible to provide a combination of any of the embodiments and modifications described in the above.

The multiprocessor system pertaining to the present invention has a function that realizes flexible and high-performance operation processing. Therefore, the multiprocessor system can be applied to a multiprocessor system such as a DVD recorder or a digital TV that performs media processing of video and audio.

The multiprocessor system pertaining to the present invention can be used in a managerial (i.e. repetitive and continuous) manner in an industry that manufactures and sells multiprocessor systems.

REFERENCE SIGNS LIST

10 multiprocessor system
11 multithreaded processor
12 extended operation processor
101 instruction memory
102 instruction decoder
103 first instruction buffer
104 second instruction buffer
105 $N^{th}$ instruction buffer
106 first register file
107 second register file
108 $N^{th}$ register file
109 set of operating units
110 write-back bus
111 control unit
112 context memory
113 instruction memory
114 instruction decoder
115 instruction buffer
116 register file
117 set of operating units
118 write-back bus
119 thread information storage unit
160 thread control unit
161 thread information storage unit
162 processor control unit
165 saving unit
166 restoring unit

The invention claimed is:

1. A multiprocessor that includes: a first processor that allocates a different register file in a plurality of register files to each of a predetermined number of threads to be executed from among a plurality of threads, and executes the predetermined number of threads in parallel; and a second processor that performs processing in accordance with a processing request made by the first processor, wherein upon receiving the processing request from the first processor, the second processor performs the processing request, and makes a writing request to the first processor for writing a value obtained as a result of the processing request, and the first processor includes:

a storage unit that has areas allocated to the plurality of threads in one-to-one correspondence;

a first control unit operable, when any of the predetermined number of threads falls in a non-execution state, to write a value into a corresponding one of the areas, the value written into the corresponding one of the areas being included in one of the register files allocated to the any thread;

a second control unit operable to (i) make the processing request to the second processor according to an instruction included in one of the predetermined number of threads, (ii) upon receiving the writing request from the second processor, judge whether the one thread is being executed, and (iii) when judging negatively, perform control such that the obtained value is written into part of one of the areas allocated to the one thread; and a third control unit operable, when the any thread falls back in an execution state, to restore, in the one of the register files, the value written into the corresponding one of the areas.

2. The multiprocessor of claim 1, wherein when making the processing request to the second processor, the second control unit outputs, to the second processor, a thread identifier that identifies the one thread, upon receiving the thread identifier from the first processor, the second processor stores therein the thread identifier, and upon receiving the writing request from the second processor, the second control unit acquires the thread identifier stored in the second processor, and specifies the one thread based on the acquired thread identifier.

3. The multiprocessor of claim 2, wherein the second control unit stores therein a head address for each of the areas, the second processor makes the writing request to the first processor after executing an instruction including (i) an operation code instructing to transfer the obtained value, (ii) a first operand specifying a register storing therein the obtained value, the register specified by the first operand being included in a register file included in the second processor and (iii) a second operand specifying a register to which the obtained value is to be transferred, the register specified by the second operand being included in a corresponding one of the register files included in the first processor, when judging that the one thread is not being executed, the second control unit specifies, for the obtained value, a writing location in the storage unit with use of the head address for the one area allocated to the one thread and the register specified by the second operand included in the executed instruction, and performs control such that the obtained value is written into the specified writing location, and when judging that the one thread is being executed, the second processor performs control such that the obtained value stored in the register specified by the first operand is written into the register specified by the second operand included in the corresponding register file identified by a corresponding one of register identifiers.

4. The multiprocessor of claim 3, wherein
the second control unit stores therein (i) each of the plurality of threads in correspondence with a flag showing whether or not each of the plurality of threads is being executed, and (ii) each of the predetermined number of threads in correspondence with one of the register identifiers, the register identifiers identifying the register files in one-to-one correspondence, and
the second control unit performs the judgment with use of the flag corresponding to the one thread.

5. The multiprocessor of claim 1, wherein
when making the processing request to the second processor, the second control unit outputs, to the second processor, a thread identifier that identifies the one thread,
upon receiving the thread identifier from the first processor, the second processor stores therein the thread identifier, and makes the writing request to the first processor, the writing request including the thread identifier, and
upon receiving the writing request from the second processor, the second control unit specifies the one thread for the judgment based on the thread identifier included in the received writing request.

6. The multiprocessor of claim 5, wherein
the second control unit stores therein a head address for each of the areas,
the second processor makes the writing request to the first processor after executing an instruction including (i) an operation code instructing to transfer the obtained value, (ii) a first operand specifying a register storing therein the obtained value, the register specified by the first operand being included in a register file included in the second processor, (iii) a second operand specifying a register to which the obtained value is to be transferred, the register specified by the second operand being included in a corresponding one of the register files included in the first processor, and (iv) the thread identifier that identifies the one thread, and
when judging that the one thread is not being executed, the second control unit specifies, for the obtained value, a writing location in the storage unit with use of the head address for the one area allocated to the one thread and the register specified by the second operand included in the executed instruction, and performs control such that the obtained value is written into the specified writing location.

7. The multiprocessor of claim 1, being a processing system that performs decoding processing of video, wherein
the execution of each of the predetermined number of threads by the first processor is part of the decoding processing that decodes a variable-length coded signal, and
the processing request performed by the second processor relates to parts of the decoding processing that are an inverse quantization, an inverse frequency transform, a motion compensation and an addition of image data.

8. The multiprocessor of claim 1, being a processing system that performs encoding processing of video, wherein
the execution of each of the predetermined number of threads by the first processor is part of the encoding processing that performs a variable-length coding on image data, and
the processing request performed by the second processor relates to parts of the encoding processing that are an error prediction for the image data to be encoded, a quantization, a frequency transform, a motion compensation, a motion search, an inverse quantization, an inverse frequency transform and an addition of the image data.

9. A processing method used in a multiprocessor that includes: a first processor that allocates a different register file in a plurality of register files to each of a predetermined number of threads to be executed from among a plurality of threads, and executes the predetermined number of threads in parallel; and a second processor that performs processing in accordance with a processing request made by the first processor, wherein
upon receiving the processing request from the first processor, the second processor performs the processing request, and makes a writing request to the first processor for writing a value obtained as a result of the processing request,
the first processor includes a storage unit that has areas allocated to the plurality of threads in one-to-one correspondence, and
the processing method includes:
a first control step of, when any of the predetermined number of threads falls in a non-execution state, writing a value into a corresponding one of the areas, the value written into the corresponding one of the areas being included in one of the register files allocated to the any thread;
a second control step of (i) making the processing request to the second processor according to an instruction included in one of the predetermined number of threads, (ii) upon receiving the writing request from the second processor, judging whether the one thread is being executed, and (iii) when judging negatively, performing control such that the obtained value is written into part of one of the areas allocated to the one thread; and
a third control step of, when the any thread falls back in an execution state, restoring, in the one of the register files, the value written into the corresponding one of the areas.

* * * * *